United States Patent
Miller (10) Patent No.: US 12,478,323 B2
(45) Date of Patent: Nov. 25, 2025

(54) ESTIMATING A METABOLIC RATE OF A USER WEARING A WEARABLE COMPUTING DEVICE

(71) Applicant: Google LLC, Mountain View, CA (US)

(72) Inventor: Nolan Andrew Miller, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 335 days.

(21) Appl. No.: 18/087,012

(22) Filed: Dec. 22, 2022

(65) Prior Publication Data

US 2023/0210457 A1 Jul. 6, 2023

Related U.S. Application Data

(60) Provisional application No. 63/295,118, filed on Dec. 30, 2021.

(51) Int. Cl.
| | | |
|---|---|---|
| *A61B 5/00* | (2006.01) | |
| *A61B 5/08* | (2006.01) | |
| *A61B 5/103* | (2006.01) | |
| *A61B 5/11* | (2006.01) | |
| *A61B 5/1455* | (2006.01) | |

(52) U.S. Cl.
CPC .......... *A61B 5/4866* (2013.01); *A61B 5/0816* (2013.01); *A61B 5/1032* (2013.01); *A61B 5/1118* (2013.01); *A61B 5/14552* (2013.01); *A61B 5/7257* (2013.01); *A61B 5/742* (2013.01); *A61B 2562/0219* (2013.01)

(58) Field of Classification Search
CPC ... A61B 5/4866; A61B 5/0816; A61B 5/1032; A61B 5/1118; A61B 5/14552; A61B 5/7257; A61B 5/742; A61B 2562/0219; A61B 5/02416; A61B 5/02438; A61B 5/681; A61B 5/14551
See application file for complete search history.

(56) References Cited

U.S. PATENT DOCUMENTS

| | | |
|---|---|---|
| 2002/0138213 A1 | 9/2002 | Mault |
| 2020/0113516 A1 | 4/2020 | Marasco et al. |

OTHER PUBLICATIONS

Fitbit, "How Does My Fitbit Device Calculate My Daily Activity?", https://help.fitbit.com/articles/en_US/Help_article/1141.htm, retrieved on Apr. 12, 2023, 6 pages.

*Primary Examiner* — Scott M. Getzow
(74) *Attorney, Agent, or Firm* — DORITY & MANNING P.A.

(57) ABSTRACT

A method for estimating a metabolic rate of a user includes obtaining pulse oximetry data for the user for a period of time. The method includes determining a rate of decline in oxygen saturation of blood of the user that is associated with a breathing rate of the user for the period of time based, at least in part, on the pulse oximetry data. The method includes estimating the metabolic rate of the user for the period of time based, at least in part, on the rate of decline in the oxygen saturation of the blood that is associated with the breathing rate of the user. The method includes providing a notification indicative of the metabolic rate for the period of time.

20 Claims, 9 Drawing Sheets

ESTIMATING A METABOLIC RATE OF A USER WEARING A WEARABLE COMPUTING DEVICE

PRIORITY CLAIM

The present application claims priority to U.S. Patent Application No. 63/295,118, titled "Methods for Estimating a Metabolic Rate of a User Wearing a Wearable Computing Device," having a filing date of Dec. 30, 2021, which is incorporated by reference herein.

FIELD

The present disclosure relates generally to wearable electronic devices. More particularly, the present disclosure relates to methods for estimating a metabolic rate of a user wearing a wearable computing device.

BACKGROUND

A wearable computing device can be worn, for instance, on a user's wrist. The wearable computing device can include an inertial measurement unit (e.g., accelerometer and gyroscope). The inertial measurement unit can obtain data indicative of movement of the user. In this manner, the metabolic rate of the user can be estimated based on motion data obtained from the inertial measurement unit.

SUMMARY

Aspects and advantages of embodiments of the present disclosure will be set forth in part in the following description, or can be learned from the description, or can be learned through practice of the embodiments.

In one aspect, a computer-implemented method for estimating a metabolic rate of a user includes obtaining pulse oximetry data for the user for a period of time. The method includes determining a rate of decline in oxygen saturation of blood of the user that is associated with a breathing rate of the user for the period of time based, at least in part, on the pulse oximetry data. The method includes estimating the metabolic rate of the user for the period of time based, at least in part, on the rate of decline in the oxygen saturation of the blood that is associated with the breathing rate of the user. The method includes providing a notification indicative of the metabolic rate for the period of time.

In another aspect, a wearable computing device is provided. The wearable computing device includes an optical sensor. The wearable computing device further includes one or processors. The one or more processors are configured to obtain, via the optical sensor, pulse oximetry data for a period of time for a user wearing the wearable computing device. The one or more processors are configured to determine a rate of decline in oxygen saturation of blood of the user that is associated with a breathing rate of the user during the period of time based, at least in part, on the pulse oximetry data. The one or more processors are configured to estimate a metabolic rate of the user for the period of time based, at least in part, on the rate of decline in the oxygen saturation of the blood that is associated with the breathing rate of the user. The one or more processors are configured to provide a notification indicative of the metabolic rate of the user for the period of time.

A non-transitory computer-readable medium which stores instructions that are executable by one or more processors of a computing device is provided. The instructions include instructions to cause the one or more processors to obtain pulse oximetry data for a user for a period of time. The instructions include instructions to cause the one or more processors to determine a rate of decline in oxygen saturation of the blood of the user that is associated with a breathing rate of the user during the period of time based, at least in part, on the pulse oximetry data. The instructions include instructions to cause the one or more processors to estimate the metabolic rate of the user for the period of time based, at least in part, on the rate of decline in the oxygen saturation of the blood that is associated with the breathing rate of the user. The instructions include instructions to cause the one or more processors to provide a notification indicative of the metabolic rate of the user for the period of time.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present invention covers such modifications and variations as come within the scope of the appended claims and their equivalents.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

As used herein, the phrase "estimating the metabolic rate of the user" refers to determining the metabolic rate of the user within a range of an actual metabolic rate of the user. In some implementations, the estimated metabolic rate of the user may be within 10 percent of the actual metabolic rate of the user. In some implementations, the estimated metabolic rate of the user may be within 5 percent of the actual metabolic rate of the user. In some implementations, the estimated metabolic rate of the user may be within 1 percent of the actual metabolic rate or the user.

As used herein, the term "about" when used in conjunction with a numerical value is intended to refer to a range of numerical values within about 20% of the numerical value.

Example aspects of the present disclosure are directed to estimating caloric expenditure of a user. For instance, a metabolic rate of a user can be estimated based on motion data that is obtained from one or more motion sensors (e.g., accelerometer, gyroscope, etc.) onboard a wearable computing device (e.g., smartwatch) worn by the user. However, estimating the metabolic rate based on motion data does not account for caloric expenditure (e.g., basal metabolic rate) of the user when engaging in sedentary activities (e.g., sitting, sleeping).

Example aspects of the present disclosure are directed to estimating a metabolic rate of a user for a period of time (e.g., a minute, an hour, a day, a week, etc.) based on pulse oximetry data of the user for the period of time. For instance, in some implementations, the wearable computing device can include an optical sensor (e.g., photoplethysmogram (PPG) sensor) configured to obtain the pulse oximetry data for the period of time. In some implementations, the pulse oximetry data can include a PPG signal that can, for instance, be indicative of changes in a characteristic (e.g., color) the user's blood that are indicative of a change in the oxygen saturation of the user's blood, such as a rate of decline in oxygen saturation of the user's blood. It should be appreciated that the oxygen saturation of the user's blood declines when the user is taking a breath. Thus, if the oxygen saturation of the user's blood is declining quickly, the breathing rate of the user will increase (that is, the user will take breaths more frequently).

In some implementations, a Fourier transform can be applied to the PPG signal to obtain a frequency signal that is representative of the PPG signal in a frequency domain. Furthermore, the frequency signal can be filtered to obtain a filtered frequency signal at a frequency of interest, such as a frequency (e.g., less than 1 Hertz) associated with the breathing rate of the user. In this manner, the rate of decline in the oxygen saturation of the user's blood that is associated with the breathing rate of the user during the period of time can be more accurately determined since other frequencies (e.g., about 60 Hz) interfering with the PPG signal can be negated (e.g., filtered out).

Furthermore, since the rate of decline in the oxygenation saturation of the blood of the user that is associated with the breathing rate of the user during the period of time can be indicative of the metabolic rate of the user for the period of time, the rate of decline in oxygenation saturation of the user can account for caloric expenditure irrespective of motion data. In this manner, estimating the metabolic rate of the user for the period of time based on the rate of decline in the oxygenation saturation of the blood that is associated with the breathing rate of the user during the period of time can account for caloric expenditure (e.g., basal metabolic rate) of the user even if the user is engaging in a sedentary activity during the period of time.

In some implementations, the metabolic rate of the user for the period of time can, in addition to the rate of decline in the oxygenation saturation of the blood of the user that is associated with the breathing rate of the user during the period of time, be estimated based on a proportionality constant for one or more body parameters (a volume of blood per pound of body weight, a volume of oxygen per volume of blood, calories per volume of the oxygen in the blood, etc.). For instance, in some implementations, the proportionality constant can be calculated based on an average value of the one or more body parameters for a population of users. In some implementations, the proportionality constant can be determined using statistical analysis. For instance, the proportionality constant can be determined using a statistics technique (e.g., linear regression). In alternative implementations, the proportionality constant can be determined using a machine learning model (e.g., random-forest classifier).

In some implementations, the metabolic rate can, in addition to the rate of decline in the oxygenation saturation of the blood of the user that is associated with the breathing rate of the user during the period of time, be estimated based on motion data indicative of the motion of the user for the period of time. For instance, the motion data can be obtained from one or more motion sensors (e.g., accelerometer, IMU, etc.) onboard a wearable computing device worn by the user.

A wearable computing device according to example aspects of the present disclosure can provide numerous technical effects and benefits. For instance, the pulse oximetry data (e.g., PPG signal) allows a rate of decline in oxygen saturation of the user's blood that is associated with the user's breathing rate for a period of time to be determined. For instance, a rate of decline in the oxygen saturation of the blood of the user that is indicative of the user's breathing rate during the period of time can be used to estimate a metabolic rate of the user for the period of time. In this manner, wearable computing devices having optical sensors (e.g., PPG sensor) according to the present disclosure can estimate the metabolic rate of a user more accurately compared to wearable computing devices estimating the metabolic rate of a user based only on motion data, because caloric expenditure (e.g., basal metabolic rate) of the user when engaging in sedentary activities can be estimated based, at least in part, on the pulse oximetry data.

Figure 1:
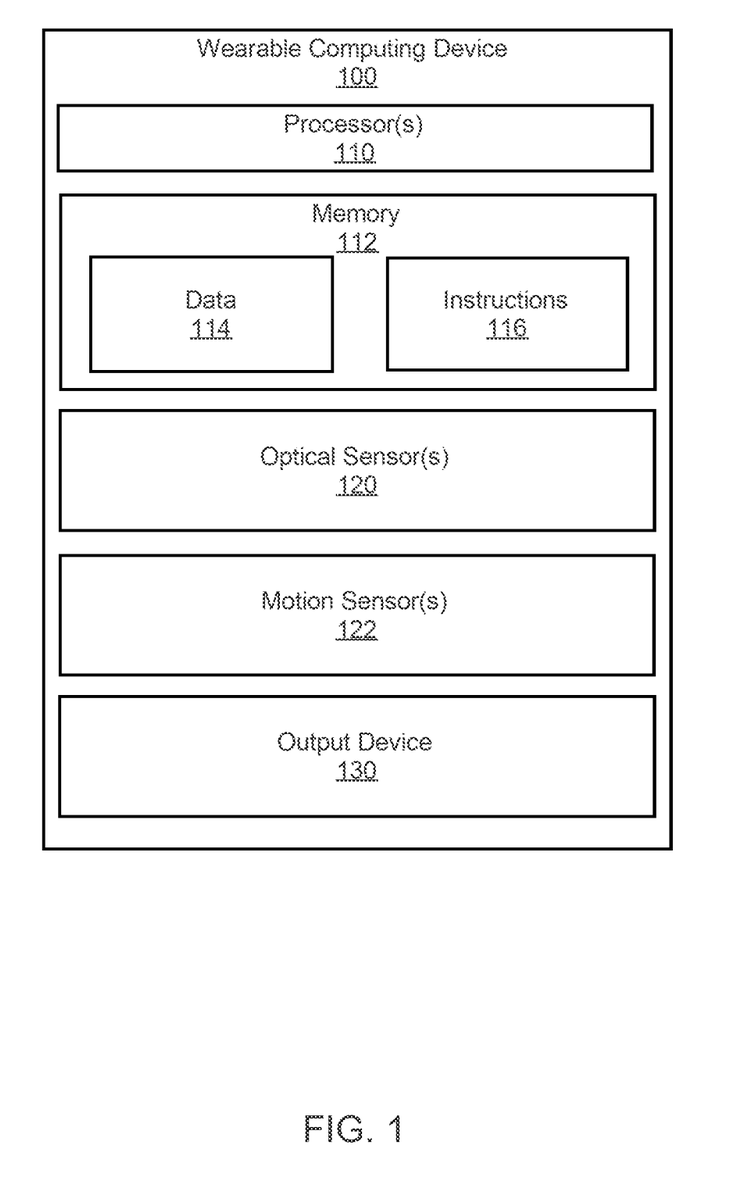
FIG. 1 depicts a block diagram of components of a wearable computing device according to some implementations of the present disclosure.
Figure 2:
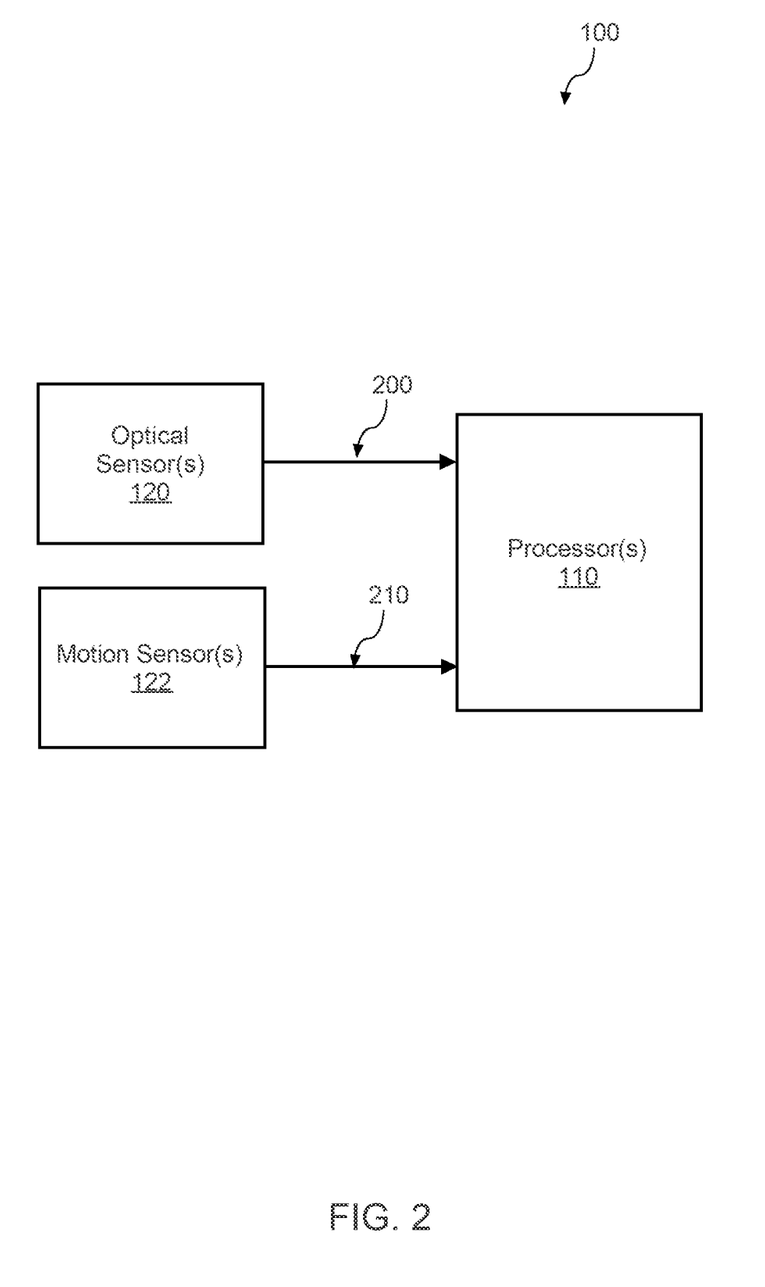
FIG. 2 depicts a computing device of a wearable computing device obtaining pulse oximetry data from an optical sensor thereof and motion data from one or motion sensors thereof according to some implementations of the present disclosure.

Referring now to the FIGS., FIGS. 1 and 2 depicts a wearable computing device 100 according to some implementations of the present disclosure. The wearable computing device 100 can, for instance, be worn on a user's wrist. It should be understood however that the wearable computing device 100 can be worn at other locations on the user's body. For instance, in some implementations, the wearable computing device 100 can be worn on the user's finger.

The wearable computing device 100 can include one or more processors 110 and a memory 112. The one or more processors 110 can be any suitable processing device (e.g., a processor core, a microprocessor, an ASIC, an FPGA, a controller, a microcontroller, etc.) and can be one processor or a plurality of processors that are operatively connected. The memory 112 can include one or more non-transitory computer-readable storage media, such as RAM, ROM, EEPROM, EPROM, flash memory devices, magnetic disks, etc., and combinations thereof. The memory 112 can store data 114 and instructions 116 which are executed by the processor(s) 110 to cause the wearable computing device 100 to perform operations, such as any of the operations described herein.

The wearable computing device 100 can include one or more optical sensors 120 (e.g., PPG sensor). The one or more optical sensors 120 can be communicatively coupled to the one or more processors 110 via a data interface (e.g., data bus). In this manner, the one or more processors 110 can obtain pulse oximetry data 200 for the user. For instance, in some implementations, the one or more optical sensors 120 can include one or more emitters (e.g., light emitting diodes) and one or more detectors. The emitter(s) can be configured to emit a light signal (e.g., infrared light) that penetrates the user's skin and reflects off an artery of the user. The detector(s) can be configured to obtain the reflected light signal. It should be understood that an amount of light that reflects off the artery can vary due, at least in part, to a characteristic (e.g., color) of arterial blood flowing through the artery. In this manner, the reflected light signal can be indicative of a change in the characteristic of the arterial blood. In some implementations, the detector(s) can include one or more charge coupled devices (CCD) configured to detect changes in the characteristic of the arterial blood based, at least in part, on the intensity of the reflected light signal. For instance, in some implementations, the optical sensor(s) 120 can include a first CCD configured to detect reflected light signals indicative of oxygenated blood (that is, blood having a first color). Alternatively, or additionally, the optical sensor(s) 120 can include a second CCD configured to detect reflected light signals indicative of deoxygenated blood (that is, blood having a second color that is different from the first color).

In some implementations, the wearable computing device 100 can include one or more motion sensors 122. The one or more motion sensors 122 can be configured to obtain motion data 210 indicative of motion of the user wearing the wearable computing device 100. For instance, the one or more motion sensors 122 can include one or more accelerometers (not shown) and one or more gyroscopes (also not shown). The one or more motion sensors 122 can be communicatively coupled to the one or more processors 110 via a data interface. In this manner, the one or more motion sensors 122 can communicate motion data 210 (e.g., acceleration data, angular velocity data, etc.) indicative of motion (e.g., walking, running, etc.) of the user to the processor(s) 110.

In some implementations the wearable computing device 100 can include one or more output devices 130. For instance, in some implementations, the one or more output devices 130 can include a display screen. The display screen can be communicatively coupled to the one or more processors 110 of the wearable computing device 100. In this manner, the one or more processors 110 can communicate data for display on the display screen. In some implementations, the data can include one or more biometrics (e.g., heart rate, metabolic rate, etc.) associated with the user. Alternatively, or additionally, the data for display on the output device(s) 130 can include, as will be discussed below in more detail, an estimated metabolic rate of the user for a period of time based, at least in part, on the pulse oximetry data 200 obtained for the period of time.

Figure 3:
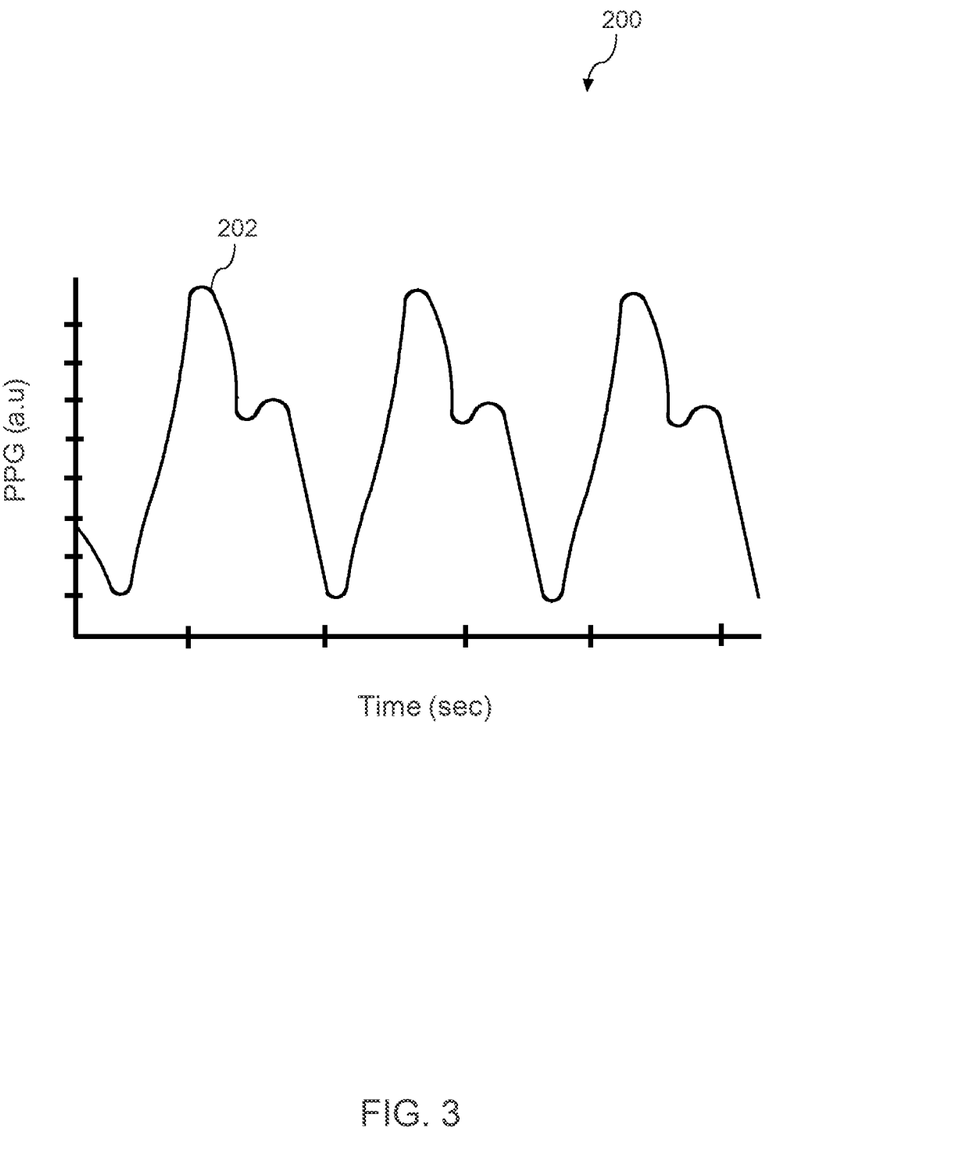
FIG. 3 depicts a graphical representation of pulse oximetry data according to some implementations of the present disclosure.

Referring now to FIG. 3, a graphical illustration of pulse oximetry data 200 is provided according to some implementations of the present disclosure. As shown, the pulse oximetry data 200 can include a PPG signal 202. The PPG signal 202 can be indicative of a change in light absorption (denoted along the vertical axis in arbitrary units) as a function of time (denoted along the horizontal axis in seconds) due, at least in part, to changes in the characteristic of arterial blood flowing through an artery of the user. It should be appreciated that portions of the PPG signal 202 having a negative slope are indicative of the arterial blood changing from a first color associated with oxygenated blood to a second color associated with deoxygenated blood. The PPG signal 202 can have this negative slope when a user takes a breath. As will be discussed below, a metabolic rate of the user can be estimated based, at least in part, on a rate of decline in the oxygen saturation of the blood that is associated with the breathing rate of the user for a period of time.

Figure 4:
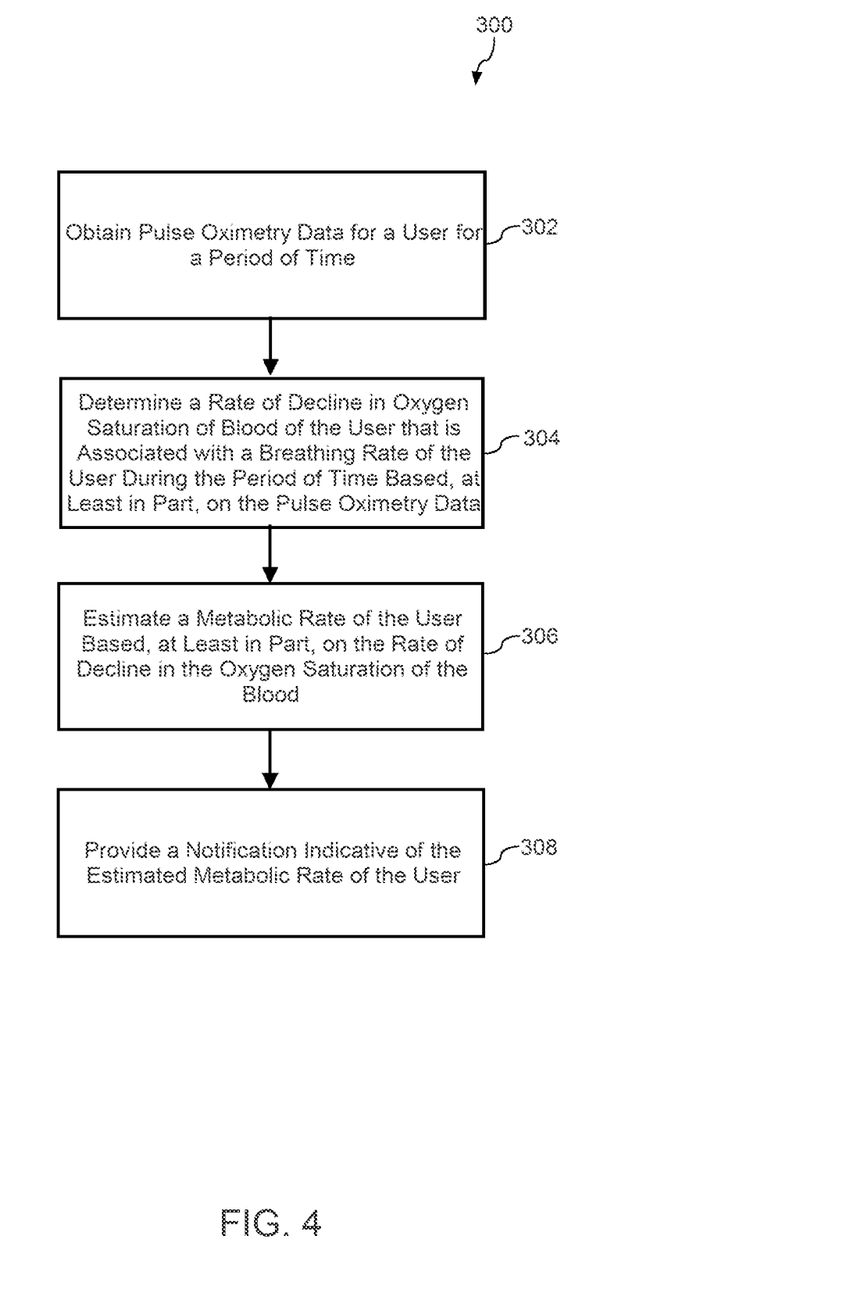
FIG. 4 depicts a flow diagram of a method for estimating a metabolic rate of a user according to some implementations of the present disclosure.

Referring now to FIG. 4, a flow diagram of a method 300 for estimating a metabolic rate of a user wearable a wearable computing device is provided according to some implementations of the present disclosure. The method 300 may be implemented using, for instance, the wearable computing device 100 discussed above with reference to FIG. 1. Alternatively, the method 400 may be implemented by a computing device (e.g., server, smartphone, etc.) that is communicatively coupled to the wearable computing device 100. It should be understood that, in some implementations, some steps of the method 300 may be implemented locally on the wearable computing device, whereas other steps of the method 300 may be implemented by a computing device that is remote from the wearable computing device and is communicatively coupled to the wearable computing device via one or more wireless networks. FIG. 4 depicts steps performed in a particular order for purposes of illustration and discussion. Those of ordinary skill in the art, using the disclosures provided herein, will understand that various steps of the method 300 or any of the other methods disclosed herein may be adapted, modified, rearranged, performed simultaneously, or modified in various ways without deviating from the scope of the present disclosure.

At (302), the method 300 can include obtaining pulse oximetry data for a user for a period of time. For instance, in some implementations, the pulse oximetry data can be obtained via an optical sensor of a wearable computing device worn by the user for the duration of the period of time. In some implementations, the optical sensor can include a PPG sensor and the pulse oximetry data can include a PPG signal that is indicative of changes in light absorption with respect to time due, at least in part, to changes in a characteristic (e.g., color) of arterial blood flowing through an artery of the user.

At (304), the method 300 can include determining a rate of decline in the oxygen saturation of blood of the user that is associated with a breathing rate of the user during the period of time based, at least in part, on the pulse oximetry data obtained at (302). It should be appreciated that the oxygen saturation of the arterial blood declines when the user takes a breath. It should also be appreciated that the color of the arterial blood changes as the oxygen saturation of the arterial blood declines. Thus, the PPG signal can indicate the rate of decline in the arterial blood each time the user breathes, because the PPG signal can indicate the color of the arterial blood changing from a first color indicative of oxygenated arterial blood to a second color indicative of deoxygenated arterial blood. In this manner, the rate of decline in the oxygen saturation of the arterial blood of the user that is associated with the user's breathing rate for the period of time can be determined based on the pulse oximetry data (e.g. PPG signal) obtained for the period of time.

In some implementations, the PPG data obtained at (302) can be provided as an input to one or more models configured to determine a rate of decline in the oxygen saturation of the blood that is associated with the breathing rate of the user. For instance, in some implementations, the model(s) can include a linear regression model. In alternative implementations, the model(s) can include a machine-learned model, such as a neural network. It should be appreciated, however, that any suitable machine-learned model can be used to determine the rate of decline in the oxygen saturation of the blood of the user that is associated with the breathing rate of the user.

At (306), the method 300 can include estimating a metabolic rate of the user based, at least in part, on the rate of decline in the oxygen saturation of the blood as determined at (304). In some implementations, the method can include estimating the metabolic rate of the user based, at least in part, on one or more additional data sources to improve the accuracy of the estimated metabolic rate. For instance, in some implementations, the method 300 can include estimating the metabolic rate of the user based on the rate of decline in the oxygen saturation of the blood and motion data (e.g., acceleration, angular velocity) obtained from one or more motion sensors of the wearable computing device and indicative of motion of the user.

At (308), the method 300 can include providing a notification (e.g., visual, auditory, etc.) indicative of the estimated metabolic rate of the user for the period of time. For instance, in some implementations, the notification can include a visual notification on a display screen of the wearable computing device. In this manner, the user can view the notification indicative of the estimated metabolic rate. In alternative implementations, the wearable computing device can communicate the notification over a wireless network to a mobile computing device (e.g., smartphone, tablet, etc.). In this manner, the user can view the notification on a display of the mobile computing device. For instance, in some implementations, the notification can be provided in a mobile application associated with the wearable computing device and executing on the mobile computing device. In such implementations, the user can access the mobile application to view the notification indicative of the metabolic rate of the user for the period of time.

Figure 5:
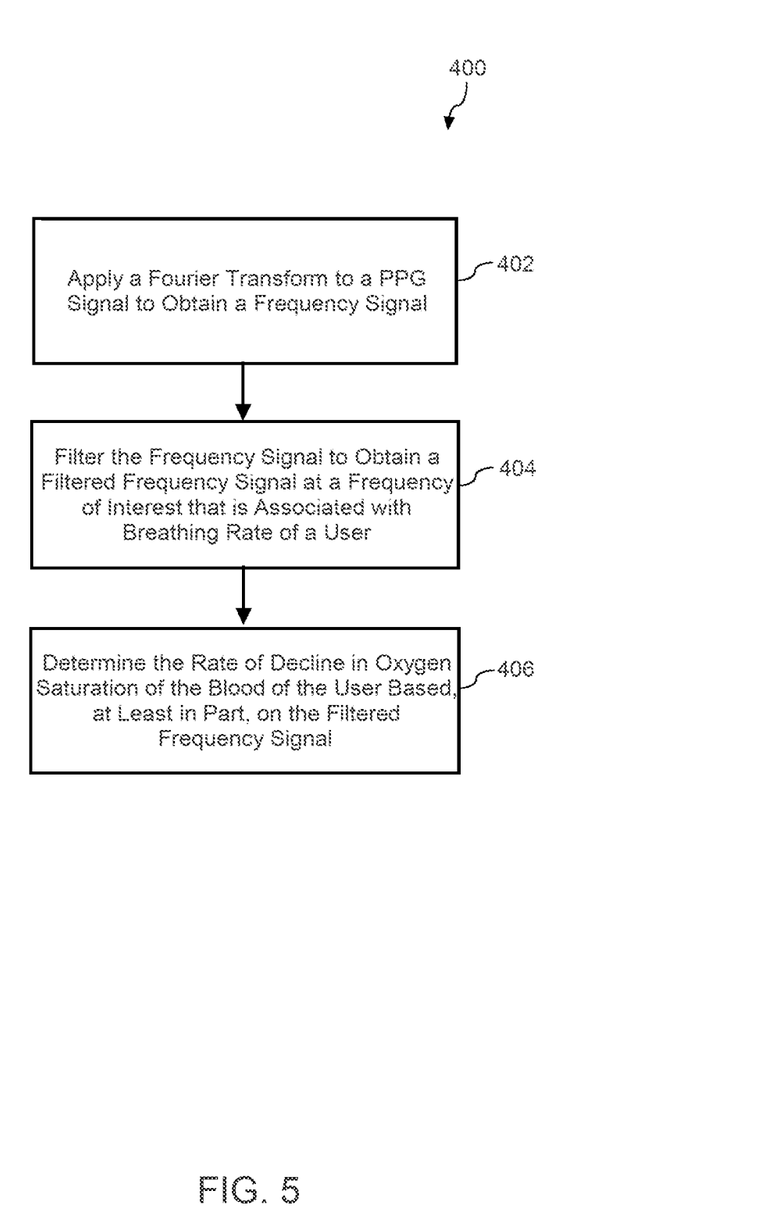
FIG. 5 depicts a flow diagram of a method for determining a rate of decline in oxygen saturation of a user's blood that is associated with a breathing rate of the user for a period of time according to some implementations of the present disclosure.

Referring now to FIG. 5, a flow diagram of a method 400 for determining a rate of decline in the oxygen saturation of blood that is associated with a breathing rate of a user for a period of time is provided according to some implementations of the present disclosure. The method 400 may be implemented using, for instance, the wearable computing device 100 discussed above with reference to FIG. 1. Alternatively, the method 400 may be implemented by a computing device (e.g., server, smartphone, etc.) that is communicatively coupled to the wearable computing device 100. It should be understood that, in some implementations, some steps of the method 400 may be implemented locally on the wearable computing device, whereas other steps of the method 400 may be implemented by a computing device that is remote from the wearable computing device and is communicatively coupled to the wearable computing device via one or more wireless networks. FIG. 5 depicts steps performed in a particular order for purposes of illustration and discussion. Those of ordinary skill in the art, using the disclosures provided herein, will understand that various steps of the method 400 or any of the other methods disclosed herein may be adapted, modified, rearranged, performed simultaneously, or modified in various ways without deviating from the scope of the present disclosure.

At (402), the method 400 can include applying a Fourier transform to the PPG signal to obtain a frequency signal. For instance, in some implementations, one or more processors of the wearable computing device can be configured to apply the Fourier transform to the PPG signal to obtain the frequency signal. In alternative implementations, the wearable computing device can be configured to transmit the PPG signal to a remote computing device configured to apply the Fourier transform to the PPG signal to the frequency signal.

At (404), the method 400 can include filtering the frequency signal obtained at (402) to obtain a filtered frequency signal at a frequency of interest that is associated with the breathing rate of the user. For instance, the frequency of interest can be less than 1 Hertz. In some implementations, the frequency of interest can be about one-fifth of 1 Hertz. In some implementations, the frequency signal can be passed through a filter (e.g., digital or analog) to generate the filtered frequency signal at the frequency of interest. More specifically, the filter can filter out other frequencies associated with noise sources (e.g., heart, alternating current power) to generate the filtered frequency signal at the frequency of interest.

At (406), the method 400 can include determining the rate of decline in the oxygen saturation of the blood based, at least in part, on the filtered frequency signal. For instance, the one or processors can analyze properties (e.g., amplitude, period, slope, etc.) of the filtered frequency signal to determine the rate of decline in the oxygen saturation of the blood that is associated with the breathing rate of the user during the period of time. In this manner, the one or more processors can estimate the metabolic rate of the user for the period of time based, at least in part, on the rate of decline in the oxygen saturation of the blood that is associated with the breathing rate of the user during the period of time.

Figure 6:
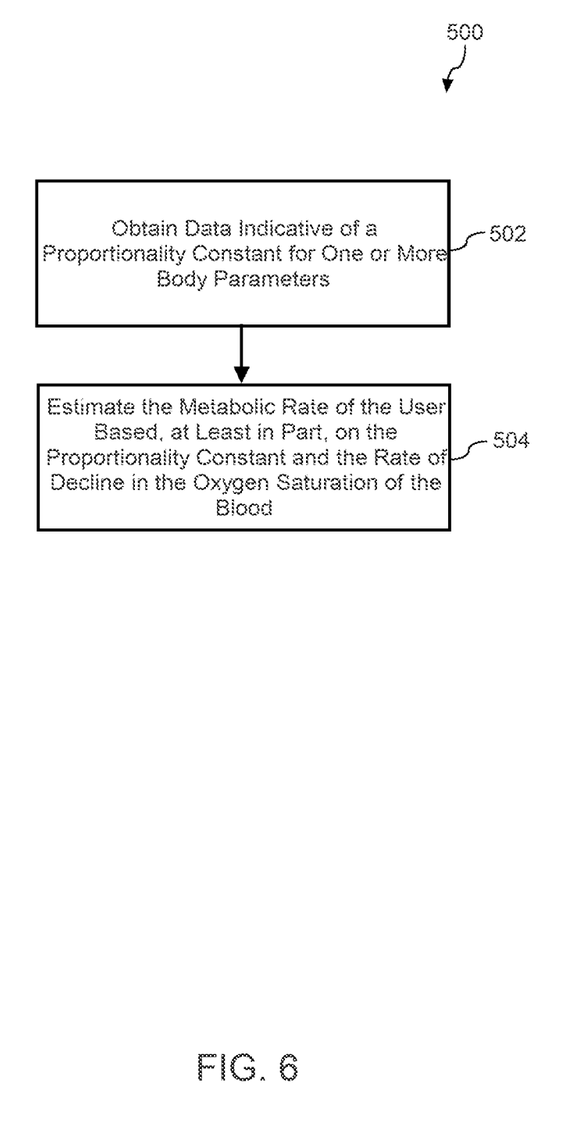
FIG. 6 depicts a flow diagram of a method for estimating a metabolic rate based on a rate of decline in oxygen saturation of blood of a user wearing a wearable computing device according to some implementations of the present disclosure.

Referring now to FIG. 6, a flow diagram of a method 500 of estimating the metabolic rate of the user based on a rate of decline in oxygen saturation of blood of a user associated with the user taking a breath while wearing a wearable computing device is provided according to some implementations of the present disclosure. The method 500 may be implemented using, for instance, the wearable computing device 100 discussed above with reference to FIG. 1. Alternatively, the method 500 can be implemented by a computing device (e.g., server, smartphone, etc.) that is communicatively coupled to the wearable computing device over one or more wireless networks. It should be understood that, in some implementations, some steps of the method 500 may be implemented locally on the wearable computing device, whereas other steps of the method 500 may be implemented by a computing device that is remote from the wearable computing device and is communicatively coupled to the wearable computing device via one or more wireless networks. FIG. 6 depicts steps performed in a particular order for purposes of illustration and discussion. Those of ordinary skill in the art, using the disclosures provided herein, will understand that various steps of the method 500 or any of the other methods disclosed herein may be adapted, modified, rearranged, performed simultaneously, or modified in various ways without deviating from the scope of the present disclosure.

At (502), the method 500 obtaining data indicative of a proportionality constant for one or more body parameters associated with the user. For instance, in some implementations, the one or more body parameters can include, without limitation, a gallon of blood per pound of body weight, a gallon of oxygen per gallon of blood, and calories per gallon of the oxygen in the blood. In such implementations, the proportionality constant can be calculated based on an average value of the one or more body parameters for a population of users. In some implementations, the proportionality constant can be determined using statistical analysis. For instance, the proportionality constant can be determined using a statistics technique (e.g., linear regression). In alternative implementations, the proportionality constant can be determined using a machine learning model.

At (504), the method 500 can include estimating the metabolic rate of a user based, at least in part, on the rate of decline in the oxygen saturation of the blood of the user that is associated with the breathing rate of the user and the proportionality constant determined for the one or more body parameters at (502). For instance, in some implementations, the metabolic rate be determined using the following formula:

$$\text{metabolic rate} = k * W * f * o * r / 100$$

where r has units of calories per second and corresponds to the rate of decline in the oxygen saturation of the blood of the user that is associated with the breathing rate of the user, f has units of gallons per pound and corresponds to the amount of blood per unit of body weight, o is a ratio indicative of gallons of oxygen per gallons of blood, W has units of pounds and corresponds to the body weight of the user, and k has units of calories per gallon and corresponds to the number of calories per gallon of oxygen per gallon of blood. In some implementations, proportionality constants can be determined for variables f, o, and k. For instance, in some implementation, the proportionality constant for f can range from 100 to 120. Alternatively, or additionally, the proportionality constant for o can be less than 1. In some implementations, the proportionality constant for k can range from 10 to 30.

Figure 7:
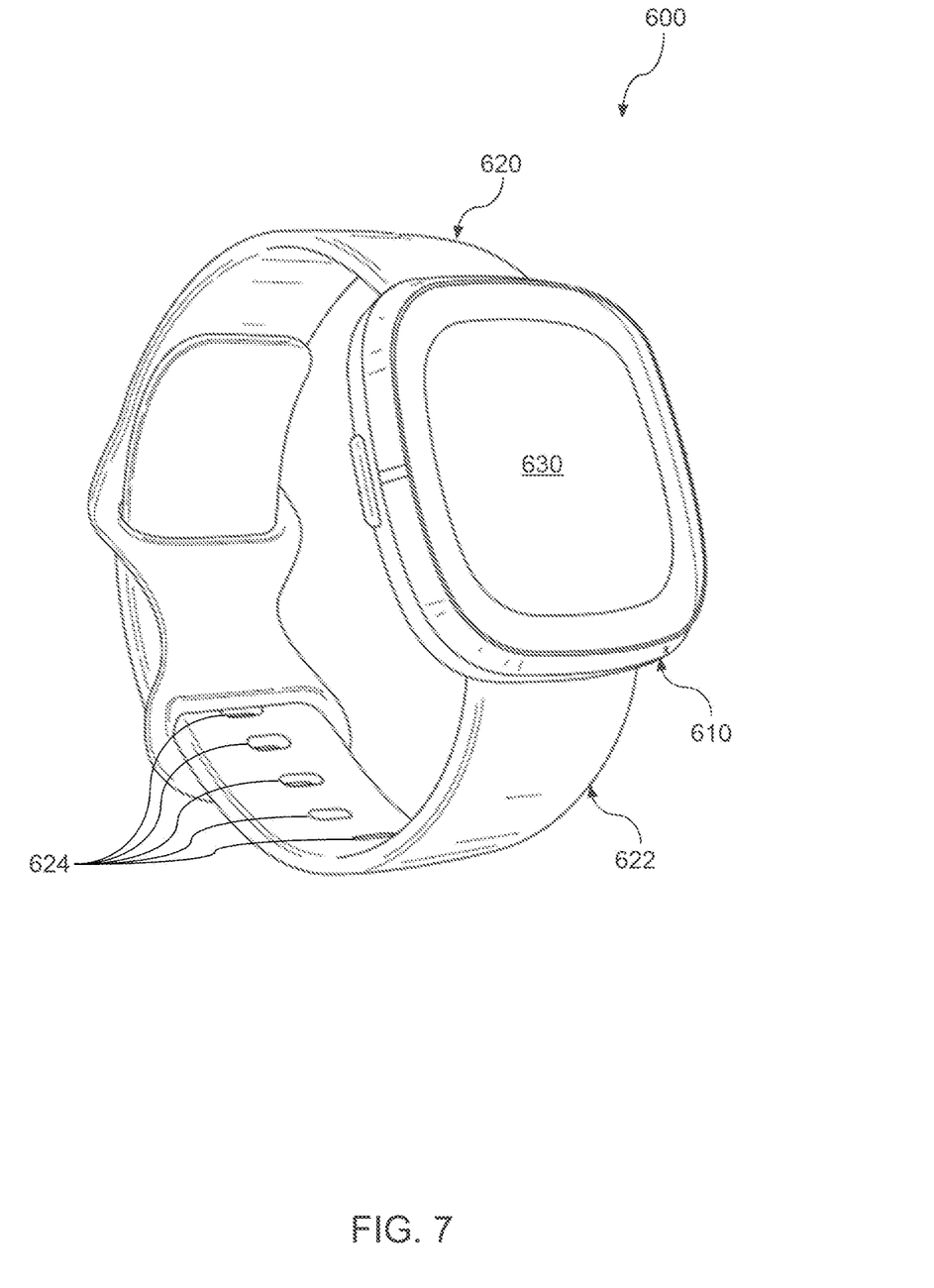
FIG. 7 depicts a front perspective view of a wearable computing device according to some implementations of the present disclosure.
Figure 8:
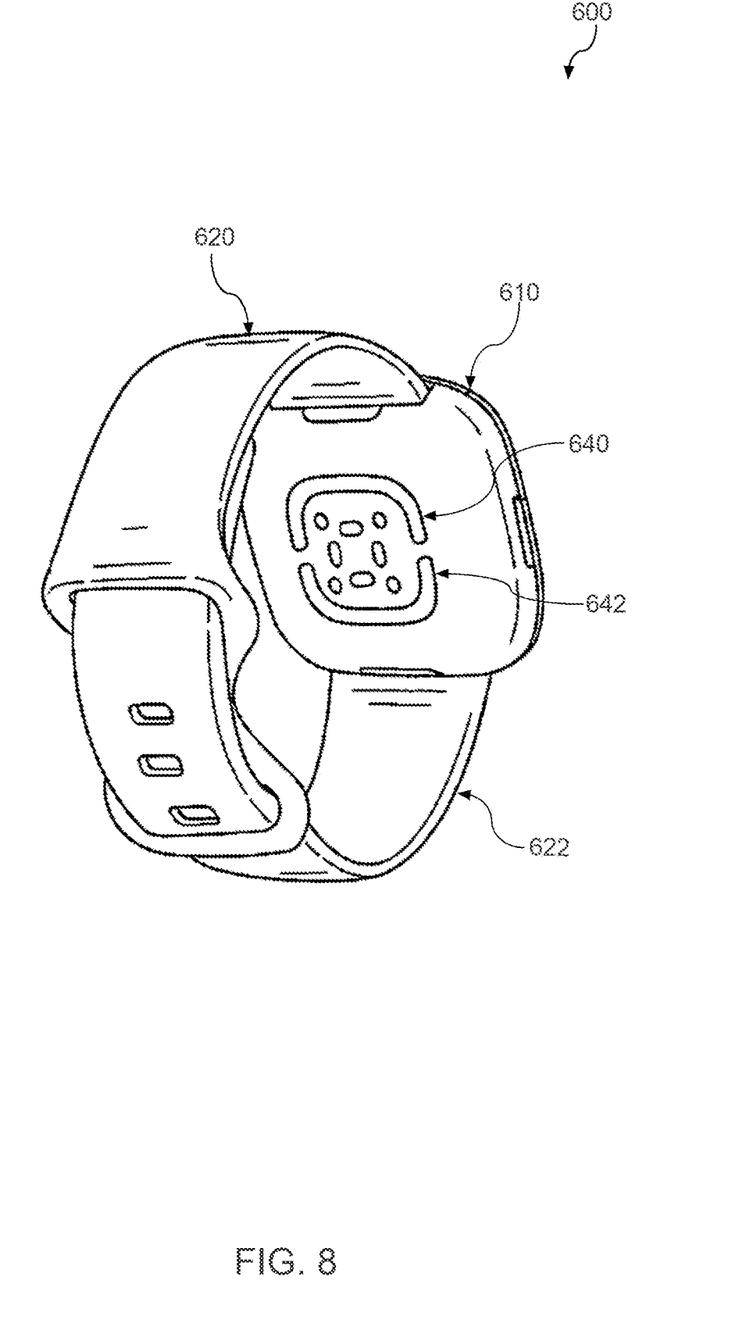
FIG. 8 depicts a rear perspective view of the wearable computing device of FIG. 7 according to some implementations of the present disclosure.

Referring now to FIGS. 7 and 8, a wearable computing device 600 according to some implementations of the present disclosure. As shown, the wearable computing device 600 can be worn, for instance, on an arm (e.g., wrist) of a user. For instance, the wearable computing device 600 can include a housing 610. The wearable computing device 600 can include one or more electronic components (e.g., disposed on printed circuit boards) disposed within the housing 610. Furthermore, the wearable computing device 600 can include a battery (not shown) that is disposed within the housing 610.

As shown, the wearable computing device 600 can include a first band 620 coupled to the housing 610 at a first location and a second band 622 coupled to the housing 610 at a second location. The first band 620 and the second band 622 can be coupled to one another to secure the housing 610 to the arm of the user. For instance, the first band 620 can include a buckle or clasp (not shown). Additionally, the second band 622 can define a plurality of apertures 624 spaced apart from one another along a length of the second band 622. In such implementations, a prong of the buckle associated with the first band 620 can extend through one of the plurality of openings defined by the second band 622 to couple the first band 620 to the second band 622.

It should be appreciated that the first band 620 can be coupled to the second band 622 using any suitable type of fastener. For instance, in some implementations, the first band 620 and the second band 622 can include a magnet. In such implementations, the first band 620 and the second band 622 can be magnetically coupled to one another to secure the housing 610 to the arm of the user.

In some implementations, the wearable computing device 600 can include a display 630 configured to display content (e.g., time, date, biometric, notifications, etc.) for viewing by the user. For instance, the display 630 can include a plurality of pixels. In some implementations, the display 630 can include an organic light emitting diode (OLED) display. It should be understood, however, that the display 630 can include any suitable type of display.

In some implementations, the wearable computing device 600 can include a first electrode 640 and a second electrode 642. It should be understood that the wearable computing device 600 can include more or fewer electrodes. As shown, the first electrode 640 and the second electrode 642 are positioned with respective apertures (e.g., cutouts) defined by the housing 610. Furthermore, the first electrode 640 and the second electrode 642 can each contact (e.g., touch) the wrist of the user. In this manner, the first electrode 640 and the second electrode 642 can be used to measure one or more biometrics (e.g., electrodermal activity, electrocardiogram) of the user.

Figure 9:
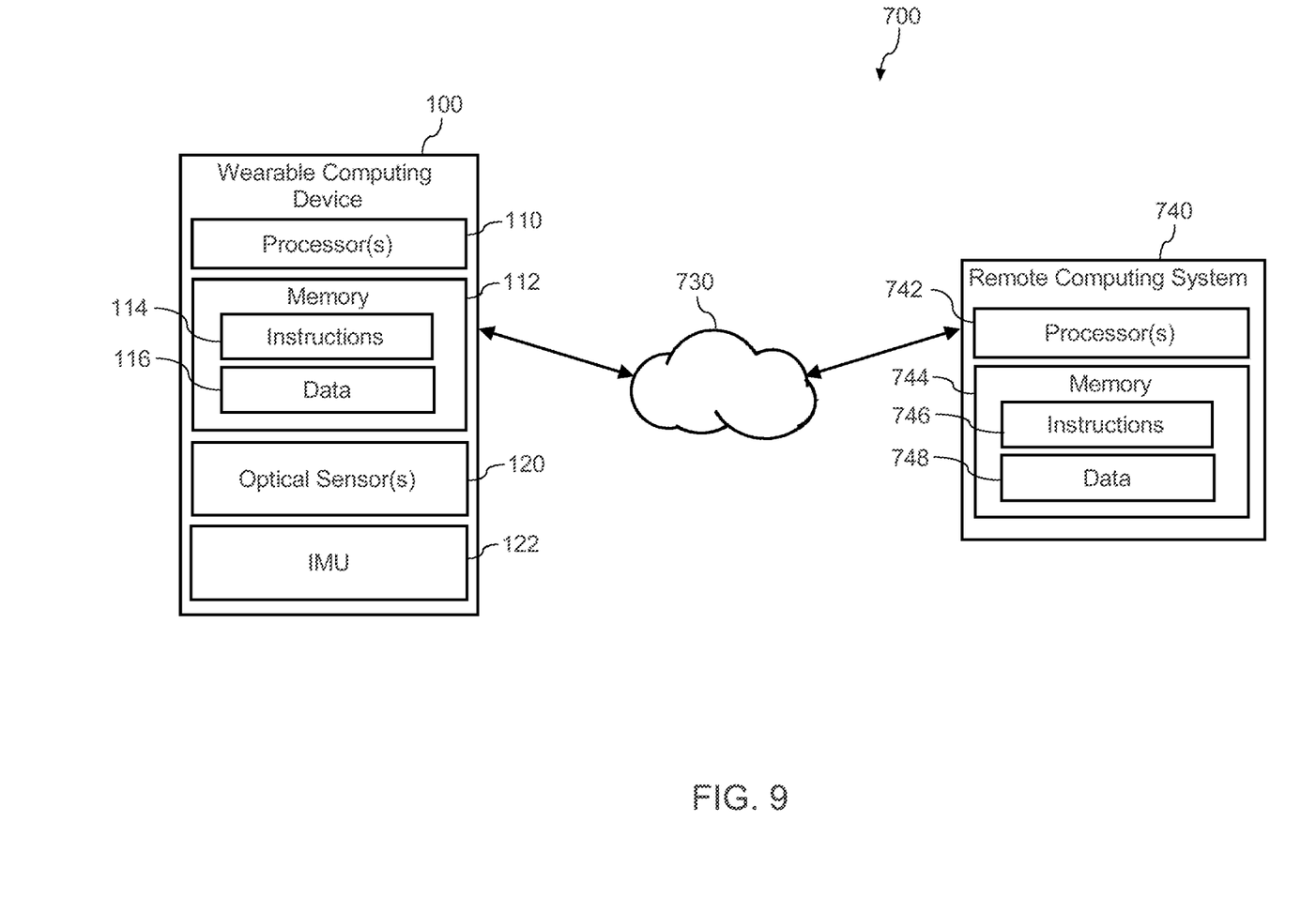
FIG. 9 depicts a computing system according to some implementations of the present disclosure.

FIG. 9 depicts an example computing system 700 according to example embodiments of the present disclosure. The computing system 700 can be used, for instance, to implement the method 300 of FIG. 4 or other aspects of any of the methods described herein. The computing system 700 includes the wearable computing device 100 discussed above with reference to FIGS. 1 and 2 and a server computing system 740. The wearable computing device 100 can be communicatively coupled to the server computing system 740 over a network 730.

The server computing system 740 includes one or more processors 742 and a memory 744. The one or more processors 742 can be any suitable processing device (e.g., a processor core, a microprocessor, an ASIC, an FPGA, a controller, a microcontroller, etc.) and can be one processor or a plurality of processors that are operatively connected. The memory 744 can include one or more non-transitory computer-readable storage media, such as RAM, ROM, EEPROM, EPROM, flash memory devices, magnetic disks, etc., and combinations thereof. The memory 744 can store data 746 and instructions 748 which are executed by the processor 742 to cause the server computing system 740 to perform operations, such as any of the operations described herein.

In some implementations, the server computing system 740 includes or is otherwise implemented by one or more server computing devices. In instances in which the server computing system 740 includes plural server computing devices, such server computing devices can operate according to sequential computing architectures, parallel computing architectures, or some combination thereof.

The network 730 can be any type of communications network, such as a local area network (e.g., intranet), wide area network (e.g., Internet), or some combination thereof and can include any number of wired or wireless links. In general, communication over the network 7300 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for estimating a metabolic rate of a user, the method comprising:
    obtaining, by one or more processors via an optical sensor arranged on a bottom side of a wearable computing device worn by the user and in contact with skin of the user, pulse oximetry data for the user of the wearable computing device for a period of time;
    determining, by the one or more processors, a rate of decline in oxygen saturation of blood of the user that is associated with a breathing rate of the user during the period of time based, at least in part, on the pulse oximetry data;
    estimating, by the one or more processors, the metabolic rate of the user for the period of time based, at least in part, on the rate of decline in the oxygen saturation of the blood that is associated with the breathing rate of the user for the period of time; and
    causing, by the one or more processors, a display screen of the wearable computing device to display a notification indicative of the estimated metabolic rate of the user for the period of time to the user.

2. The computer-implemented method of claim 1, wherein determining the rate of decline in the oxygen saturation of the blood of the user that is associated with the breathing rate of the user for the period of time includes determining, by the one or more processors, a rate at which a color of the blood changes from a first color indicative of oxygenated blood to a second color indicative of deoxygenated blood each time the user takes a breath during the period of time.

3. The computer-implemented method of claim 1, wherein the pulse oximetry data includes a photoplethysmogram (PPG) signal.

4. The computer-implemented method of claim 3, wherein determining the rate of decline in the oxygen saturation of the blood that is associated with the breathing rate of the user comprises:
    applying, by the one or more processors, a Fourier transform to the PPG signal to obtain a frequency signal;
    filtering, by the one or more processors, the frequency signal to obtain a filtered frequency signal at a frequency of interest that is associated with the breathing rate of the user; and
    determining, by the one or more processors, the rate of decline in the oxygen saturation of the blood based, at least in part, on the filtered frequency signal.

5. The method of claim 1, wherein estimating the metabolic rate of the user comprises:
    obtaining, by the one or more processors, a proportionality constant for a body parameter, the proportionality constant indicative of an average value of the body parameter for a population of users; and
    determining, by the one or more processors, the metabolic rate based, at least in part, on the proportionality constant and the rate of decline in the oxygen saturation of the blood.

6. The method of claim 5, wherein the body parameter comprises a ratio of a volume of oxygen to a volume of the blood.

7. The method of claim 5, wherein the body parameter comprises a volume of blood per pound.

8. The method of claim 5, wherein the body parameter a number of calories per gallon of the blood.

9. The method of claim 1, further comprising:
    obtaining, by the one or more processors, motion data indicative of movement of the user for the period of time; and
    determining, by the one or more processors, the metabolic rate of the user for the period of time based, at least in part, on the motion data and the rate of decline in the oxygen saturation of the blood.

10. The method of claim 9, wherein the motion data comprises at least one of acceleration data from an accelerometer or angular velocity data from a gyroscope.

11. A wearable computing device comprising:
    an optical sensor arranged on a bottom side of the wearable computing device worn by a user and in contact with skin of the user; and
    one or more processors configured to:
        obtain, via the optical sensor, pulse oximetry data for a period of time for a user wearing the wearable computing device;
        determine a rate of decline in oxygen saturation of blood of the user that is associated with a breathing rate of the user for the period of time based, at least in part, on the pulse oximetry data;
        estimate a metabolic rate of the user for the period of time based, at least in part, on the rate of decline in the oxygen saturation of the blood that is associated with the breathing rate of the user for the period of time; and cause a display screen of the wearable computing device to display a notification indicative of the estimated metabolic rate of the user for the period of time to the user.

12. The wearable computing device of claim 11, wherein the optical sensor comprises a photoplethysmogram (PPG) sensor, and wherein the pulse oximetry data comprises a PPG signal.

13. The wearable computing device of claim 12, wherein to determine the rate of decline in the oxygen saturation of the blood that is associated with the breathing rate of the user, the one or more processors are configured to:

apply a Fourier transform to the PPG signal to obtain a frequency signal;

filter the frequency signal to obtain a filtered frequency signal at a frequency of interest that is associated with the breathing rate of the user; and determine the rate of decline in the oxygen saturation of the blood based, at least in part, on the filtered frequency signal.

14. The wearable computing device of claim 13, wherein the frequency of interest is less than 1 Hertz.

15. The wearable computing device of claim 12, wherein to determine the rate of decline in the oxygen saturation of the blood that is associated with the breathing rate of the user, the one or more processors are configured to determine the rate of decline in the oxygen saturation of the blood when the PPG signal indicates the user is taking a breath.

16. The wearable computing device of claim 11, wherein to provide the notification indicative of the metabolic rate, the one or more processors are configured to cause a display of the wearable computing device to display the metabolic rate.

17. The wearable computing device of claim 11, further comprising:

one or more motion sensors configured to obtain motion data indicative of motion of the user.

18. The wearable computing device of claim 17, wherein to estimate the metabolic rate of the user for the period of time, the one or more processors are configured to estimate the metabolic rate based, at least in part, on the motion data and the rate of decline in the oxygen saturation of the blood that is associated with the breathing rate of the user.

19. The wearable computing device of claim 17, wherein the one or more motion sensors include an accelerometer.

20. A non-transitory computer-readable medium which stores instructions that are executable by one or more processors of a computing device, the instructions comprising:

instructions to cause the one or more processors to obtain pulse oximetry data via an optical sensor arranged on a bottom side of the computing device worn by the user and in contact with skin of the user for a period of time;

instructions to cause the one or more processors to determine a rate of decline in oxygen saturation of blood of the user that is associated with a breathing rate of the user during the period of time based, at least in part, on the pulse oximetry data;

instructions to cause the one or more processors to estimate the metabolic rate of the user for the period of time based, at least in part, on the rate of decline in the oxygen saturation of the blood that is associated with the breathing rate of the user for the period of time; and instructions to cause the one or more processors to cause a display screen of the computing device to display a notification indicative of the estimate metabolic rate of the user for the period of time to the user.

* * * * *